United States Patent
Touzani et al.

(10) Patent No.: US 6,971,512 B2
(45) Date of Patent: Dec. 6, 2005

(54) STORAGE DEVICE FOR DVD CASES

(76) Inventors: William N. Touzani, 7655 Moonmist, #123, Houston, TX (US) 77036; Malika Belhaj, 7655 Moonmist, #123, Houston, TX (US) 77036

( * ) Notice: Subject to any disclaimer, the term of this patent is extended or adjusted under 35 U.S.C. 154(b) by 130 days.

(21) Appl. No.: 10/644,985

(22) Filed: Aug. 21, 2003

(65) Prior Publication Data

US 2005/0040058 A1 Feb. 24, 2005

(51) Int. Cl.[7] .............................................. B65D 85/57
(52) U.S. Cl. ................. 206/308.1; 206/473; 211/41.12
(58) Field of Search ............................ 206/307, 308.1, 206/309, 310, 311, 312, 473; 211/40, 41.12, 211/194; 312/9.58

(56) References Cited

U.S. PATENT DOCUMENTS

| | | | | |
|---|---|---|---|---|
| 1,995,273 | A | * | 3/1935 | Dohrwardt .................. 198/801 |
| 5,040,687 | A | * | 8/1991 | Whittington .................. 211/40 |
| 5,518,112 | A | * | 5/1996 | Ono et al. ................ 206/308.3 |
| 5,964,356 | A | * | 10/1999 | Gareau et al. ................ 211/40 |
| 6,520,347 | B2 | * | 2/2003 | Caplan et al. ................ 211/40 |

* cited by examiner

Primary Examiner—David T. Fidei

(57) ABSTRACT

A device for storing and displaying a plurality of DVD cases and the like comprising a plurality of parallel rigid L-shaped profiles pivotably connected, characterized in that the convex side of each L-shaped profile includes at least one adhesive layer to fixedly attach at least one DVD case by the spine side or by its adjacent back side area, hence allowing the front covers of the case to pivot freely.

7 Claims, 3 Drawing Sheets

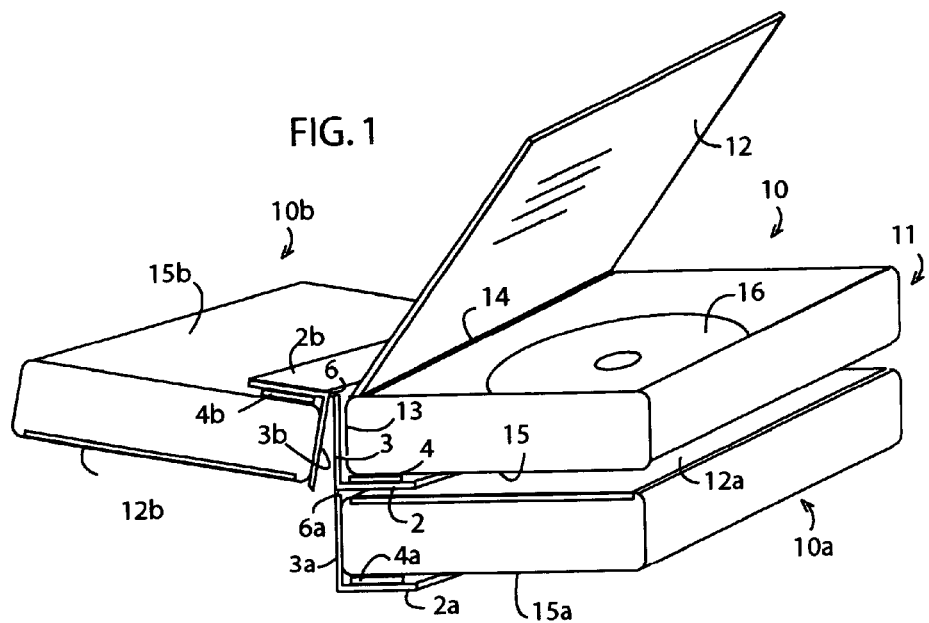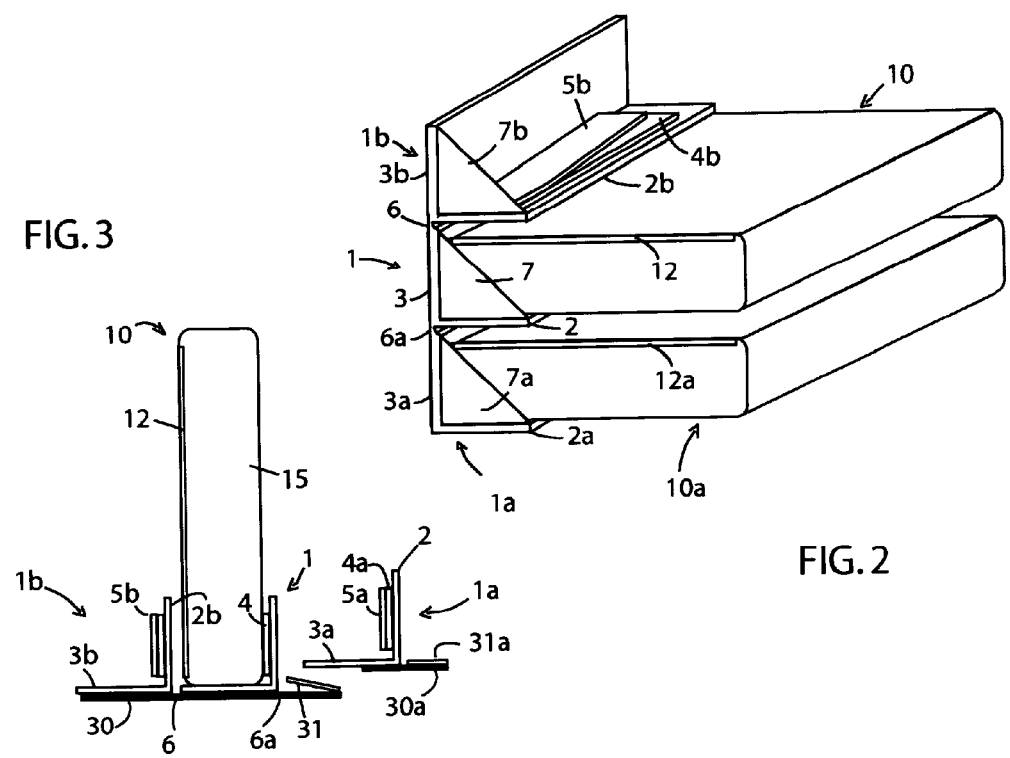

FIG. 4
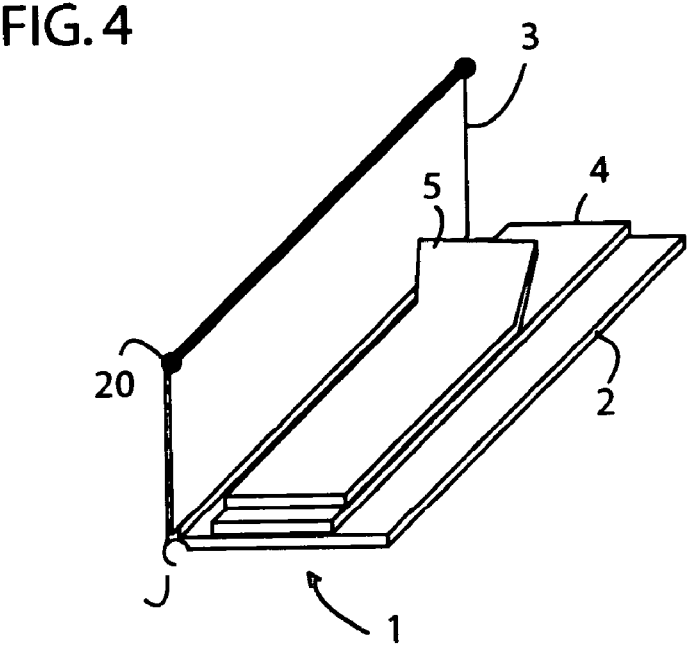
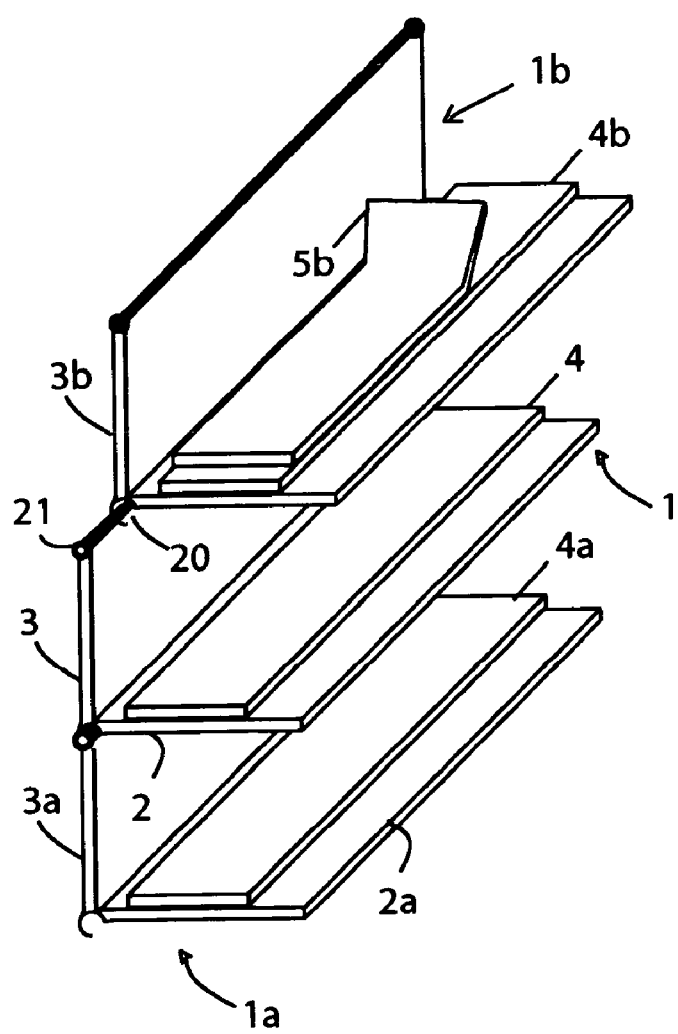
FIG. 5

STORAGE DEVICE FOR DVD CASES

FIELD OF THE INVENTION

The invention relates to media storage devices and methods for holding a collection of individual media units in general, and DVD cases in particular.

BACKROUND OF THE INVENTION

Various display racks and storage devices are well known in the art. They range from simple book shelves to stackable racks to carousels While various cases have been developed for storing groups of CD's in order to reduce space and increase the organization, the DVD market does not enjoy the same trend. Related prior art on the construction of a CD case can be found in U.S. Pat. No. 4,874,085. DVD cases are generally much larger than CD cases and designed intentionally to provide maximum information on its content than its CD counterpart. With DVD's now the most popular medium for recorded movies, people are therefore looking for permanent ways to organize their collections in order to reduce the time consuming and often frustrating task to locate a particular movie.

While the majority of storage devices are designed to handle single DVD cases with no logical labeling methods, the consumer has no way of permanently arranging their library of DVD's into distinct collections or groups of DVD's featuring selected topics, actors, etc . . . , without the risk of others returning the DVD's into the wrong slot, constantly taking the sequence out of order. Such organization is becoming necessary, as large numbers of DVDs are owned by single families. While a similar situation happened with music CDs, cases for DVDs remain larger than CDs, with a larger spine area, which makes them more suitable for the present invention.

SUMMARY OF THE INVENTION

The purpose of the invention is to present an improved device for storing and organizing a group of DVD cases in a permanent order, and displaying them in a way similar to pages on a book. This device is to be used mostly by the consumer to organize existing collections of DVD's or alike.

DVD cases are generally injection molded or thermoformed from a rigid plastic material in a single case comprising three distinct parts; a base part for holding the compact disk on one side and the content description on the outer side; a folding cover panel showing the highlights of the DVD; and a flat spine containing the title of the DVD. The spine side of the case is perpendicularly and pivotably hinged to the front cover panel of the case while fixedly connected to the back side section of the case. The width of the spine and the adjacent area on the back side of the DVD case are joined at a 90 degrees angle and are the subject of the present invention.

The device of the invention includes a plurality of ridgid and pivotable L-shaped rib members or profiles, each comprising two flat arm or wall members at substantially right angles from each other, and including an adhesive layer placed in the inside of at least one of the arm members to fixedly attach the DVD case. The spine of the DVD case is placed directly on one arm of the rib member while the adjacent back side of the case is automatically lined-up against the other arm member. The consumer is required to first remove the protective layer of the double sided adhesive or the adhesive transfer tape in order to lodge the DVD into the right angle corner of the L-shaped rib.

Because the adhesive substance may blur the clarity of the title text displayed in the spine area of the DVD case, it may instead be placed on the opposing arm supporting the base cover. Sometimes, however, having one layer in each arm member of the rib may be required. The front cover of the DVD case remains unobstructed and free to pivot from its closed position to an open position for accessing the enclosed compact disk. The rib member, on the other hand remains hugging constantly the spine and back side corner of the DVD case.

In a first embodiment, the L-shaped rib members are parallel in orientation and connected contiguously with an integral U-shaped hinge or channel bridging the outer corner of one L-shaped rib to the extremity of one arm member of the next rib member. The U-shaped hinge allows two parallel, contiguous and rigid rib members to pivot to a maximum of 180 degrees from their original position. Another object of the invention is to provide each individual L-shaped rib member with an interlocking hinge mechanism in order to selectively connect it to the next rib member and to the previous one.

A further object of the invention is the connect a plurality of L-shaped profile members by bonding them together with a flexible sheet of transparent plastic or tape, over the outer side of each of the adjacent arm members supporting the spine sides of the DVD cases, providing in addition an integral hinge member along the intersection of the two contiguous rib members.

A still further object of the invention is to achieve the L-shaped construction for fixing a multitude of DVD cases by simply die-cutting a flat sheet of plastic material.

Other objects, advantages, and unique features of the invention will become more apparent from the following detailed description when taken in conjunction with the accompanying drawings.

BREIF DESCRIPTION OF THE DRAWINGS

FIG. 1 is a perspective view of a device including 3 L-shaped rib members for storing DVD cases in accordance with the invention.

FIG. 2 is perspective view the same device, with rib members including a raised elevation at one extremity of each rib member.

FIG. 3 is cross sectional side view of a device including 3 L-shaped rib members for storing DVD cases bonded together with an external flexible layer of plastic material.

FIG. 4 is a perspective view of a single L-shaped rib member including external connecting means.

FIG. 5 is a perspective view of a device including 3 L-shaped rib members removably inter-connected, for storing DVD cases in accordance with the invention.

DETAILED DESCRIPTION OF THE PREFERRED EMBODIMENTS

Figure 6:
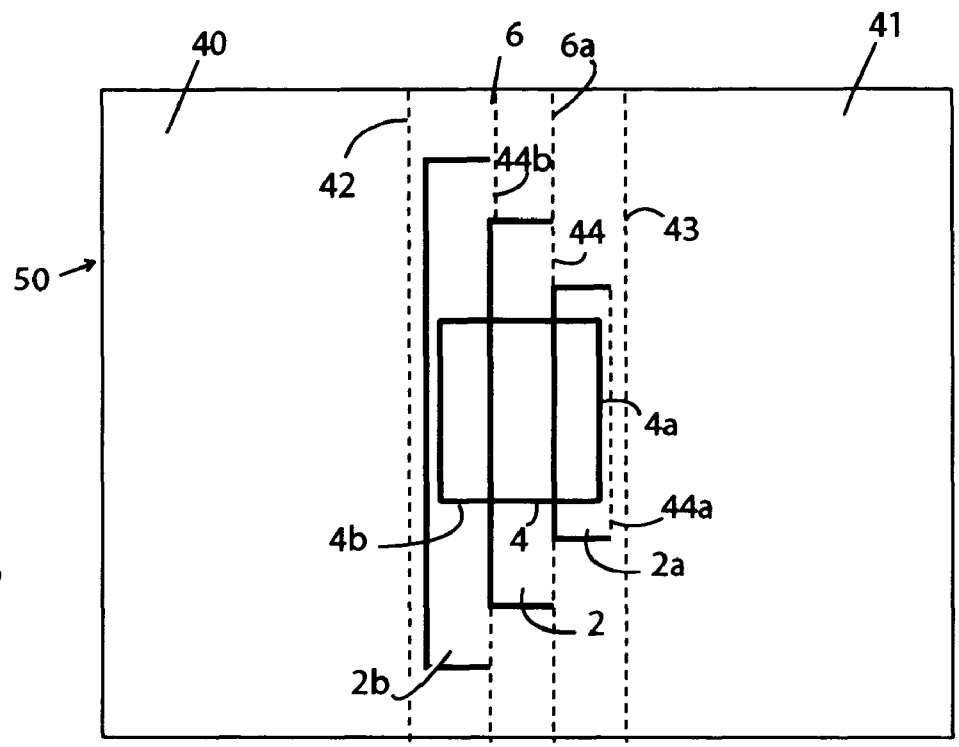
FIG. 6 is a top view of a sheet of plastic material die-cut in a special way in order to create the L-shaped ribs of the invention along with the necessary fold lines.

With Reference to FIGS. 1 and 2, the general configuration of the storage and display device of the invention can be appreciated. This device is composed of a set of three pivotable L-shaped profiles or ribs 1, 1a and 1b are shown, housing DVD cases 10, 10a and 10b fixedly positioned within each profile by means of adhesive layer 4, 4a and 4b.The adhesive layers can be placed by a transfer tape or other means, and include a protective tape 5 that the consumer removes prior to placing a DVD case. For practical reasons the device of the invention includes a plurality of pivotable and contiguous L-shaped ribs to accommodate between 3 and 6 DVD cases. L-shaped rib 1b is pivotable to a maximum of 180 degrees along its longitudinal axis before resting against lower rib 1.

Ribs 1, 1a and 1b are designed to pivot around an axes of rotation created by U-shaped hinges or grooves 6 and 6a. The hinges can be covering the entire length of the L-shaped ribs or portions of it A rib member is so called for its ability to support and protect a DVD case and includes two perpendicular wall members or arms 2 and 3 for receiving case 10, 2a and 3a for receiving case 10a and 2b and 3b for receiving case 10b, capable of fixedly housing the corner of a DVD case not including the case front cover panel 12, 12a and 12b. Front cover panel 12 of DVD case 10a is pivotable along hinge 14 to allow removing or returning compact disk 16.

While adhesive layers 4, 4a and 4b are shown to be placed on arm members 3, 3a and 3b supporting the back side of the DVD cases 15, 15a and 15b, they can also be placed on the spine side of the case 13.

FIG. 2 also shows anchor members 7,7a and 7b providing an anchor for DVD cases before placing them over the adhesive material in order to insure that all cases are lined up evenly, at least on the ground side of the device. The anchors can take several geometrical shapes and can even interlock or stack-up with each other in order to prevent thinner DVD cases from collapsing over each other.

As shown in FIGS. 1 and 2, the device of the invention is placed on a flat surface for selecting, returning or simply browsing through DVD case covers. For storage or display however, the device of the invention is typically placed on any standard shelf unit.

FIG. 3 shows another embodiment of the invention with contiguous L-shaped ribs pivotably connected by an external flexible tape member 30 fixedly glued or otherwise bonded to outer side of arm members 3, 3a and 3b. Rib 1a is shown to include adhesive tape 30a connected to one half of arm member 3a, while the other half of tape 30a is still protected by disposable tape 31a, which must be removed or pealed by the consumer before adding another rib member. Flexible tape 30 creates a natural pivotable hinge member 6 at the intersection of two rib members.

FIG. 4 and FIG. 5 represent a single and a plurality of removably attachable L-shaped ribs along a pivot axis defined by pivot parts and fastening means 20 and 21. Several means of pivotable interlocking arrangements are known in the art. In the present embodiment however, the outer corner of a rib member is shown to include a U-shaped channel or groove 20, releasably adapted to receive protrusion member 21 for a snap fit connection.

Removing or adding individual ribs with attached DVD cases may be nessary to reorganize a storage device, or to expand it. This would eliminate the need to tear-off a DVD case from its rib member and risk damaging it.

Figure 7:
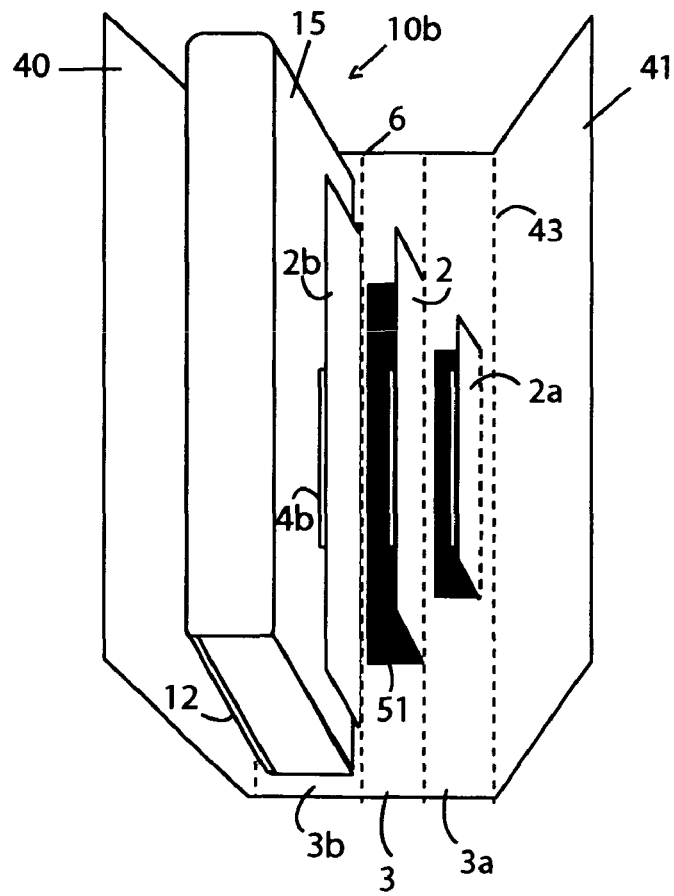
FIG. 7 is a top perspective view of the die-cut sheet of plastic with the flaps raised to provide the required L-shaped ribs of the invention.

The storage device of the invention in FIG. 6 and FIG. 7 is formed by folding a unitary sheet 50 of die-cut, rigid plastic material such as polypropylene, with a plurality of cut through U-shaped flaps 2, 2a and 2b with their respective fold lines 44, 44a and 44b allowing the flaps to manually pivot 90 degrees upwardly and be used as back side support for a DVD case 10, 10a and 10b.

51 represents the empty holes left when flap members 2, 2a and 2b have been pushed through. While the combination of flap members 2 and 3, 2a and 3a, 2b and 3b, make-up the L-shaped ribs required by the invention, fold lines 6 and 6a represent the axis of rotation of each individual rib member with its corresponding DVD cases. Members 40 and 41 are pivotable along fold lines 42 and 43, and represent the front and back covers of the device in the invention. The covers can also include retaining means such as an elastic cord or snap-on buttons.

What is claimed is:

1. A media device for storing and displaying a DVD case having a spine, said DVD case, including a top cover panel for getting access to an inside of the case, pivotably hinged to a side of the spine of the DVD case for listing the title of the DVD, and a base member for holding at least one disk and providing the back cover for the DVD case, comprising:
   at least a single substantially L-shaped rib member, said rib member made of plastic material and includes of two adjacent and perpendicularly arm members being pivotable on the spine whereby one arm member is able to receive the entire width of the spine, while the other arm member is able to receive at least the adjacent area to the spine located in a back side member of the case;
   and hinge means for connecting a corner side of one L-shaped rib member to an outer extremity of one arm member of an adjacent L-shaped rib member having the same orientation and pivotable along the same longitudinal axis,
   wherein the hinge means are in the form of a fold line engraved into a plastic sheet connecting at least in part two adjacent L-shaped ribs.

2. The storage device of claim 1 wherein the hinge means are in the form of a U-shaped channel connecting at least in part two adjacent L-shaped ribs.

3. The storage device of claim 1 wherein the hinge means are in the form of a grove on a flat surface connecting at least in part two adjacent L-shaped ribs.

4. A media device for storing and displaying a DVD case having a spine, said DVD case, including a top cover panel for getting access to an inside of the case, pivotably hinged to a side of the spine of the DVD case for listing the title of the DVD, and a base member for holding at least one disk and providing the back cover for the DVD case, comprising:
   at least a single substantially L-shaped rib member, said rib member made of plastic material and includes of two adjacent and perpendicularly arm members being pivotable on the spine whereby one arm member is able to receive the entire width of the spine, while the other arm member is able to receive at least the adjacent area to the spine located in a back side member of the case;
   and hinge means for connecting a corner side of one L-shaped rib member to an outer extremity of one arm member of an adjacent L-shaped rib member having the same orientation and pivotable along the same longitudinal axis,
   wherein the L-shaped rib member includes at least one adhesive layer for fixedly attaching the spine member of at least one single case.

5. A media device for storing and displaying a DVD case having a spine, said DVD case, including a top cover panel for getting access to an inside of the case, pivotably hinged to a side of the spine of the DVD case for listing the title of the DVD, and a base member for holding at least one disk and providing the back cover for the DVD case, comprising:

at least a single substantially L-shaped rib member, said rib member made of plastic material and includes of two adjacent and perpendicularly arm members being pivotable on the spine whereby one arm member is able to receive the entire width of the spine, while the other arm member is able to receive at least the adjacent area to the spine located in a back side member of the case;

and hinge means for connecting a corner side of one L-shaped rib member to an outer extremity of one arm member of an adjacent L-shaped rib member having the same orientation and pivotable along the same longitudinal axis, wherein the L-shaped rib member includes at least one adhesive layer for fixedly attaching the back side member of a single case.

6. A media device for storing and displaying a DVD case having a spine, said DVD case, including a top cover panel for getting access to an inside of the case, pivotably hinged to a side of the spine of the DVD case for listing the title of the DVD, and a base member for holding at least one disk and providing the back cover for the DVD case, comprising:

at least a single substantially L-shaped rib member, said rib member made of plastic material and includes of two adjacent and perpendicularly arm members being pivotable on the spine whereby one arm member is able to receive the entire width of the spine, while the other arm member is able to receive at least the adjacent area to the spine located in a back side member of the case;

and hinge means for connecting a corner side of one L-shaped rib member to an outer extremity of one arm member of an adjacent L-shaped rib member having the same orientation and pivotable along the same longitudinal axis, wherein the L-shaped rib member including at least one adhesive layer for fixedly attaching a single case and an external adhesive tape for connecting a contiguous L-shaped rib.

7. A media device for storing and displaying a DVD case having a spine, said DVD case, including a top cover panel for getting access to an inside of the case, pivotably hinged to a side of the spine of the DVD case for listing the title of the DVD, and a base member for holding at least one disk and providing the back cover for the DVD case, comprising:

at least a single substantially L-shaped rib member, said rib member made of plastic material and includes of two adjacent and perpendicularly arm members being pivotable on the spine whereby one arm member is able to receive the entire width of the spine, while the other arm member is able to receive at least the adjacent area to the spine located in a back side member of the case;

and hinge means for connecting a corner side of one L-shaped rib member to an outer extremity of one arm member of an adjacent L-shaped rib member having the same orientation and pivotable along the same longitudinal axis, wherein the L-shaped rib member includes a self adhesive hook and loop along the inside of at least one arm member for removably attaching a single DVD case.

\* \* \* \* \*